(12) United States Patent
Zecha et al.

(10) Patent No.: US 12,698,721 B2
(45) Date of Patent: Aug. 4, 2026

(54) STATOR RETENTION OF GAS TURBINE ENGINE

(71) Applicant: RTX Corporation, Farmington, CT (US)

(72) Inventors: Sarah J. Zecha, Farmington, CT (US); Brian Barainca, Farmington, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/507,517

(22) Filed: Nov. 13, 2023

(65) Prior Publication Data

US 2024/0076992 A1 Mar. 7, 2024

Related U.S. Application Data

(62) Division of application No. 16/677,090, filed on Nov. 7, 2019, now Pat. No. 11,852,038.

(51) Int. Cl.
| | |
|---|---|
| *F01D 9/04* | (2006.01) |
| *F01D 9/02* | (2006.01) |
| *F01D 25/24* | (2006.01) |
| *F02C 9/22* | (2006.01) |

(52) U.S. Cl.
CPC .............. *F01D 9/042* (2013.01); *F01D 9/02* (2013.01); *F01D 25/246* (2013.01); *F02C 9/22* (2013.01); *F05D 2230/64* (2013.01)

(58) Field of Classification Search
CPC . F01D 9/02; F01D 9/042; F01D 9/044; F01D 25/246; F05D 2260/38
See application file for complete search history.

(56) References Cited

U.S. PATENT DOCUMENTS

| | | | |
|---|---|---|---|
| 4,832,568 A | 5/1989 | Roth et al. | |
| 5,074,752 A | 12/1991 | Murphy et al. | |
| 5,320,490 A | 6/1994 | Corbin et al. | |
| 5,765,993 A | 6/1998 | Weiss | |
| 6,655,912 B2 * | 12/2003 | Bos ......................... | F01D 9/042 |
| | | | 415/209.4 |
| 7,311,495 B2 | 12/2007 | Ashley et al. | |
| 9,771,815 B2 | 9/2017 | Remy | |
| 2018/0340449 A1 | 11/2018 | Barainca et al. | |
| 2021/0079800 A1 | 3/2021 | Amadon et al. | |
| 2021/0140375 A1 | 5/2021 | Zecha et al. | |

* cited by examiner

*Primary Examiner* — Courtney D Heinle
(74) *Attorney, Agent, or Firm* — CANTOR COLBURN LLP

(57) ABSTRACT

A stator vane assembly of a gas turbine engine includes a stator shroud having a plurality of shroud openings formed therein. The stator shroud defines a flowpath surface. The assembly includes a plurality of stator vanes, one stator vane of the plurality of stator vanes installed in each shroud opening of the stator shroud. A volume of potting material is located in the plurality of shroud openings to retain the stator vanes thereat. One or more retainers are located at a back surface of the stator shroud opposite the flowpath surface to restrict circumferential movement of the plurality of stator vanes relative to the stator shroud.

4 Claims, 7 Drawing Sheets

STATOR RETENTION OF GAS TURBINE ENGINE

CROSS-REFERENCE TO RELATED APPLICATIONS

This application claims the benefit of U.S. application Ser. No. 16/677,090 filed Nov. 7, 2019, the disclosure of which is incorporated herein by reference in its entirety.

BACKGROUND

Exemplary embodiments of the present disclosure pertain to the art of gas turbine engines, and in particular to retention of stator vanes for gas turbine engines.

A gas turbine engine typically includes a rotor assembly which extends axially through the engine. A stator assembly is radially spaced from the rotor assembly and includes an engine case which circumscribes the rotor assembly. A flow path for working medium gasses is defined within the case and extends generally axially between the stator assembly and the rotor assembly.

The rotor assembly includes an array of rotor blades extending radially outwardly across the working medium flowpath into proximity with the case. Arrays of stator vane assemblies are alternatingly arranged between rows of rotor blades and extend inwardly from the case across the working medium flowpath into proximity with the rotor assembly to guide the working medium gases when discharged from the rotor blades. Some stator vane assemblies, such as those at an entrance and or an exit of a fan or low pressure compressor portion of the gas turbine engine, are formed as rings with an outer shroud and an inner shroud and stator vanes fixed to and extending between the inner shroud and the outer shroud. The inner shroud and the outer shroud may both be fixed to stationary structure of the gas turbine engine.

In some configurations, the vanes are retained at the inner shroud and at the outer shroud by a potting material, which is often a rubber or similar material. The potting material, however, is often subject to cracking, and/or disbonding between the potting material and the vane, due to a combination of stresses on the potting material, and temperature cycling of the potting material. In the event of such cracking or disbond, the potting material is repaired or replaced.

BRIEF DESCRIPTION

In one embodiment, a stator vane assembly of a gas turbine engine includes a stator shroud having a plurality of shroud openings formed therein. The stator shroud defines a flowpath surface. The assembly includes a plurality of stator vanes, one stator vane of the plurality of stator vanes installed in each shroud opening of the stator shroud. A volume of potting material is located in the plurality of shroud openings to retain the stator vanes thereat. One or more retainers are located at a back surface of the stator shroud opposite the flowpath surface to restrict circumferential movement of the plurality of stator vanes relative to the stator shroud.

Additionally or alternatively, in this or other embodiments a retainer of the one or more retainers includes one or more retainer legs extending through a shroud opening of the plurality of shroud openings between a stator vane and the stator shroud.

Additionally or alternatively, in this or other embodiments a recess is formed in the flowpath surface of the stator shroud to receive a retainer leg of the one or more retainer legs.

Additionally or alternatively, in this or other embodiments the one or more retainer legs contact one or more of the stator vane or the stator shroud at the shroud opening.

Additionally or alternatively, in this or other embodiments two retainers are installed at a stator vane of the plurality of stator vanes.

Additionally or alternatively, in this or other embodiments a retainer of the one or more retainers contacts and exerts a circumferential force on circumferentially adjacent stator vanes of the plurality of stator vanes.

Additionally or alternatively, in this or other embodiments the retainer includes a first clip portion located at and contacting a first stator vane of the plurality of stator vanes, and a second clip portion located at and contacting a second stator vane circumferentially adjacent to the first stator vane. A spring extends between the first clip portion and the second clip portion and is configured to urge the first clip portion away from the second clip portion.

Additionally or alternatively, in this or other embodiments the retainer is formed of a compressible material.

Additionally or alternatively, in this or other embodiments the retainer is a band extending circumferentially across the plurality of stator vanes, the retainer including a plurality of band openings through which the plurality of stator vanes extend. The plurality of band openings are circumferentially smaller than the plurality of shroud openings.

Additionally or alternatively, in this or other embodiments the band in a full annulus about an engine central longitudinal axis.

In another embodiment, a gas turbine engine includes a combustor, a turbine in flow communication with the combustor, and a stator assembly. The stator assembly includes a stator shroud having a plurality of shroud openings formed therein. The stator shroud defines a flowpath surface. The assembly includes a plurality of stator vanes. One stator vane of the plurality of stator vanes is installed in each shroud opening of the stator shroud. A volume of potting material is located in the plurality of shroud openings to retain the stator vanes thereat. One or more retainers are positioned at a back surface of the stator shroud opposite the flowpath surface to restrict circumferential movement of the plurality of stator vanes relative to the stator shroud.

Additionally or alternatively, in this or other embodiments a retainer of the one or more retainers includes one or more retainer legs extending through a shroud opening of the plurality of shroud openings between a stator vane and the stator shroud.

Additionally or alternatively, in this or other embodiments a recess is formed in the flowpath surface of the stator shroud to receive a retainer leg of the one or more retainer legs.

Additionally or alternatively, in this or other embodiments the one or more retainer legs contact one or more of the stator vane or the stator shroud at the shroud opening.

Additionally or alternatively, in this or other embodiments a retainer of the one or more retainers contacts and exerts a circumferential force on circumferentially adjacent stator vanes of the plurality of stator vanes.

Additionally or alternatively, in this or other embodiments the retainer includes a first clip portion located at and contacting a first stator vane of the plurality of stator vanes, a second clip portion located at and contacting a second stator vane circumferentially adjacent to the first stator vane, and a spring extending between the first clip portion and the second clip portion configured to urge the first clip portion away from the second clip portion.

Additionally or alternatively, in this or other embodiments the retainer is formed of a compressible material.

Additionally or alternatively, in this or other embodiments the retainer is a band extending circumferentially across the plurality of stator vanes. The retainer includes a plurality of band openings through which the plurality of stator vanes extend. The plurality of band openings are circumferentially smaller than the plurality of shroud openings.

Additionally or alternatively, in this or other embodiments the band in a full annulus about an engine central longitudinal axis.

In yet another embodiment, a method of forming a stator assembly a gas turbine engine includes installing a stator vane into a shroud opening of a stator shroud, the stator shroud defining a flow path surface of the gas turbine engine. A retainer is installed at a back surface of the stator shroud opposite the flowpath surface to restrict circumferential movement of the stator vane relative to the stator shroud. A volume of potting material is installed into the shroud opening between the stator vane and the stator shroud after installing the retainer. The stator vane is retained at the shroud opening via the volume of potting material, and the retainer is secured at the stator vane via the volume of potting material.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
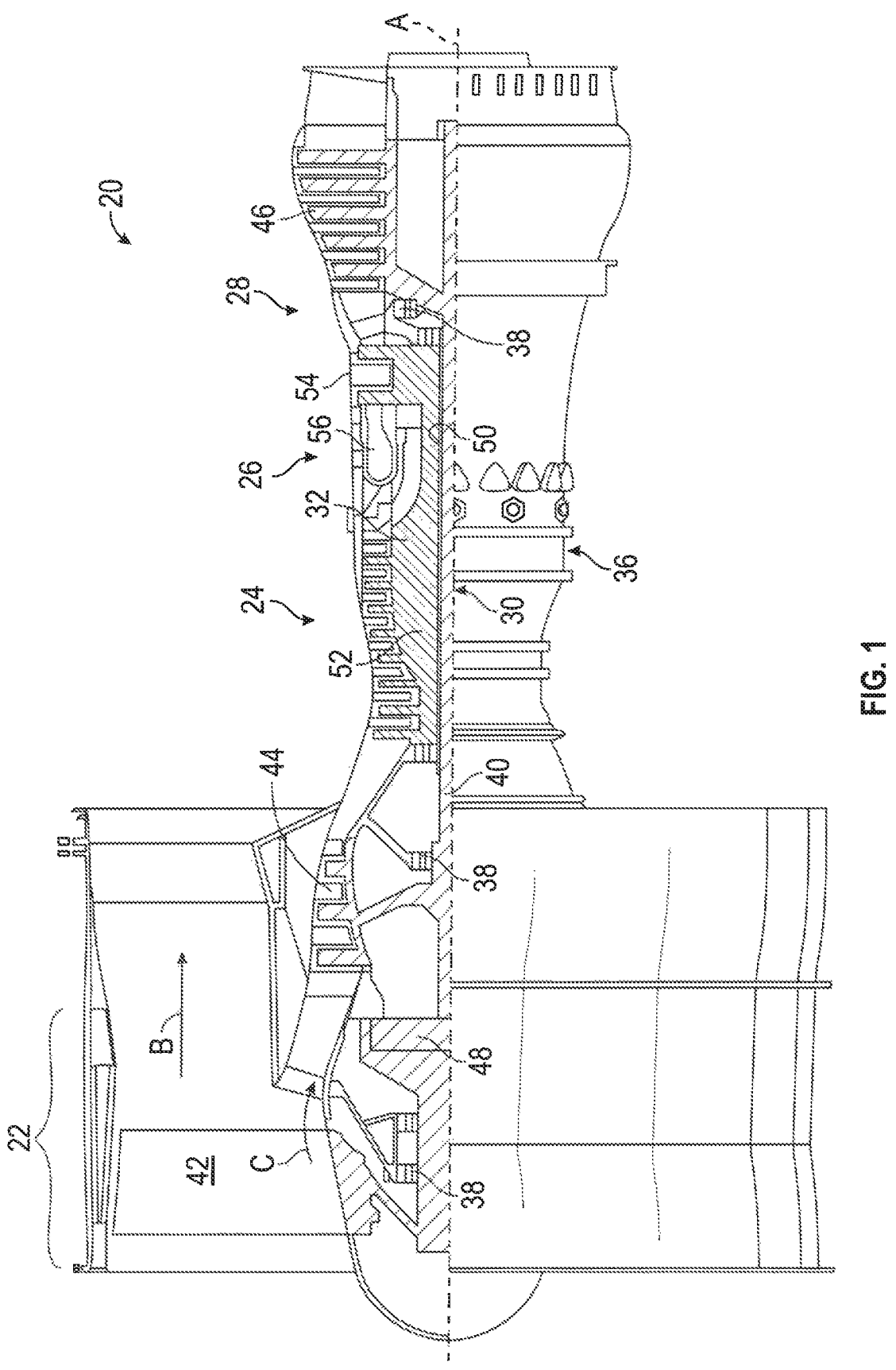
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ^\circ \text{R})/(518.7^\circ \text{R})]^{0.5}$. The "Low corrected fan tip speed" as disclosed herein according to one non-limiting embodiment is less than about 1150 ft/second (350.5 m/sec).

Figure 2:
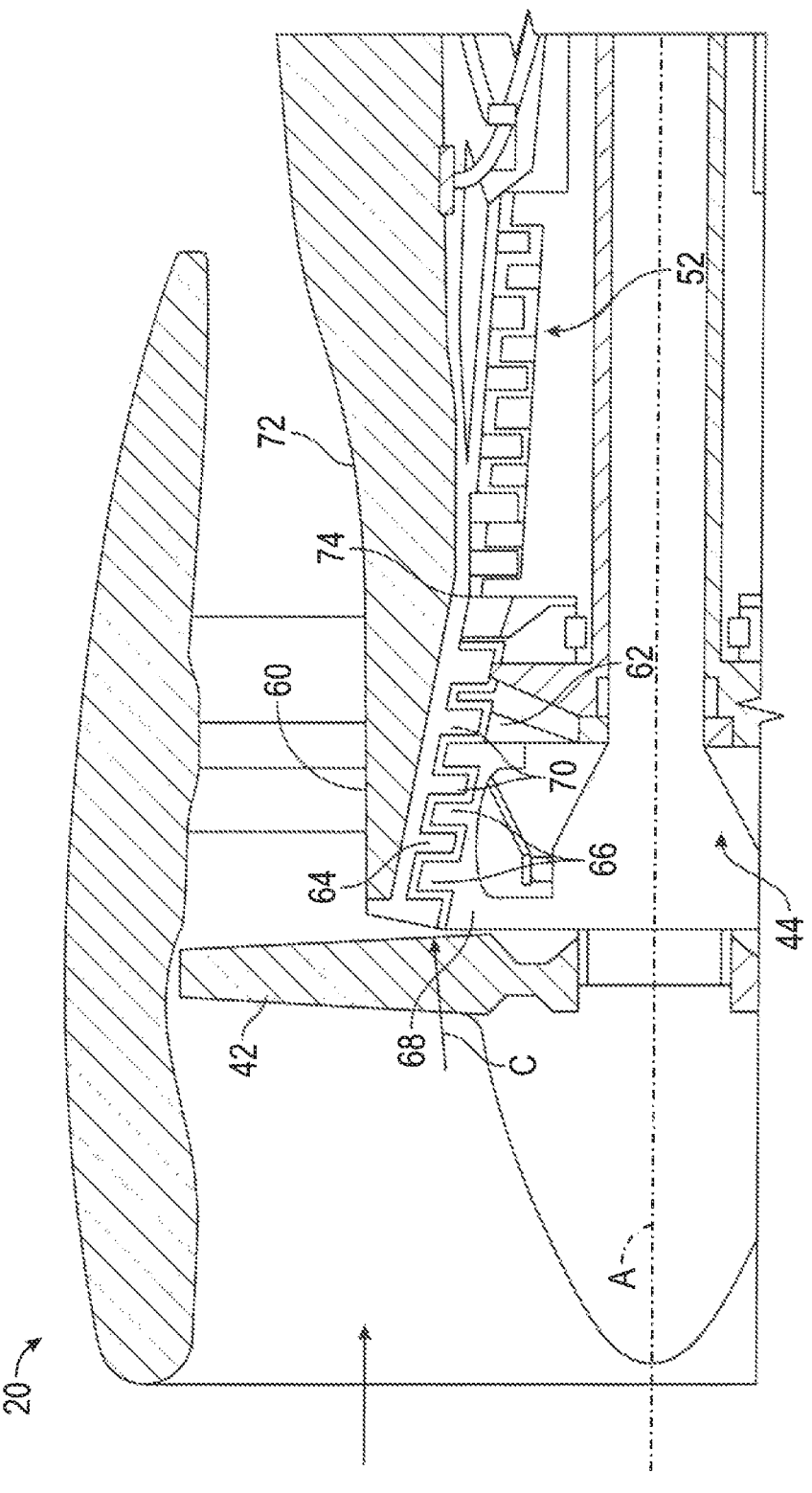
FIG. 2 is a partial cross-sectional view of a compressor section of a gas turbine engine.

Referring now to FIG. 2, the low pressure compressor (LPC) 44 includes an LPC case 60 with one or more LPC rotors 62 located in the LPC case 60 and rotatable about the engine central longitudinal axis A. One or more LPC stators 64 are located axially between successive LPC rotors 62. Each LPC rotor 62 includes a plurality of rotor blades 66 extending radially outwardly from a rotor disc 68, while each LPC stator 64 includes a plurality of stator vanes 70 extending radially inwardly from the LPC case 60. The LPC 44 further includes an intermediate case 72 located axially downstream from the LPC case 60 and is utilized to direct airflow C from the LPC 44 to the high pressure compressor 52. An exit stator 74 is located in the intermediate case 72. While the following description is in the context of an exit stator 74, one skilled in the art will readily appreciated that the present disclosure may be readily applied to other stator assemblies.

Figure 3:
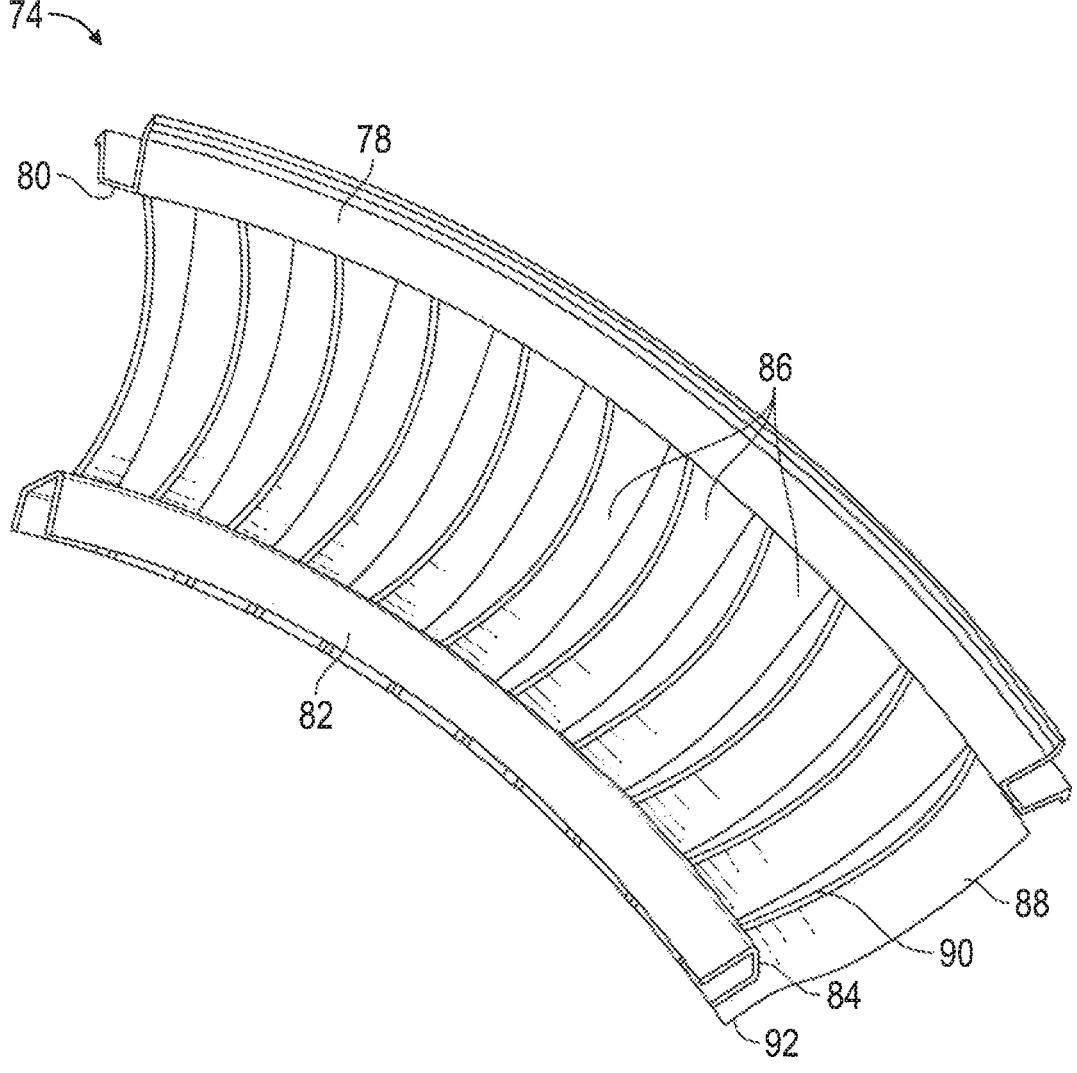
FIG. 3 is a schematic view of a stator assembly of a gas turbine engine.

Referring now to FIG. 3, the exit stator 74 includes an outer shroud 78 extending circumferentially around an inner surface of the intermediate case 72 and defining an outer flowpath surface 80. The exit stator 74 similarly includes an inner shroud 82 radially spaced from the outer shroud 78 defining an inner flowpath surface 84. In some embodiments, the outer shroud 78 and the inner shroud 82 are formed from metallic materials, for example, an aluminum material or alternatively a composite material such as a thermoplastic polyetherimide material. A plurality of stator vanes 86 extend between the outer shroud 78 and the inner shroud 82. In some embodiments, the stator vanes 86 are formed from an epoxy resin impregnated carbon material. The stator vanes 86 each include a vane body 88 extending between the outer shroud 78 and the inner shroud 82. The vane body 88 further extends from an upstreammost leading edge 90 to a downstreammost trailing edge 92 relative to the general direction of the airflow C.

Figures 4, 5:
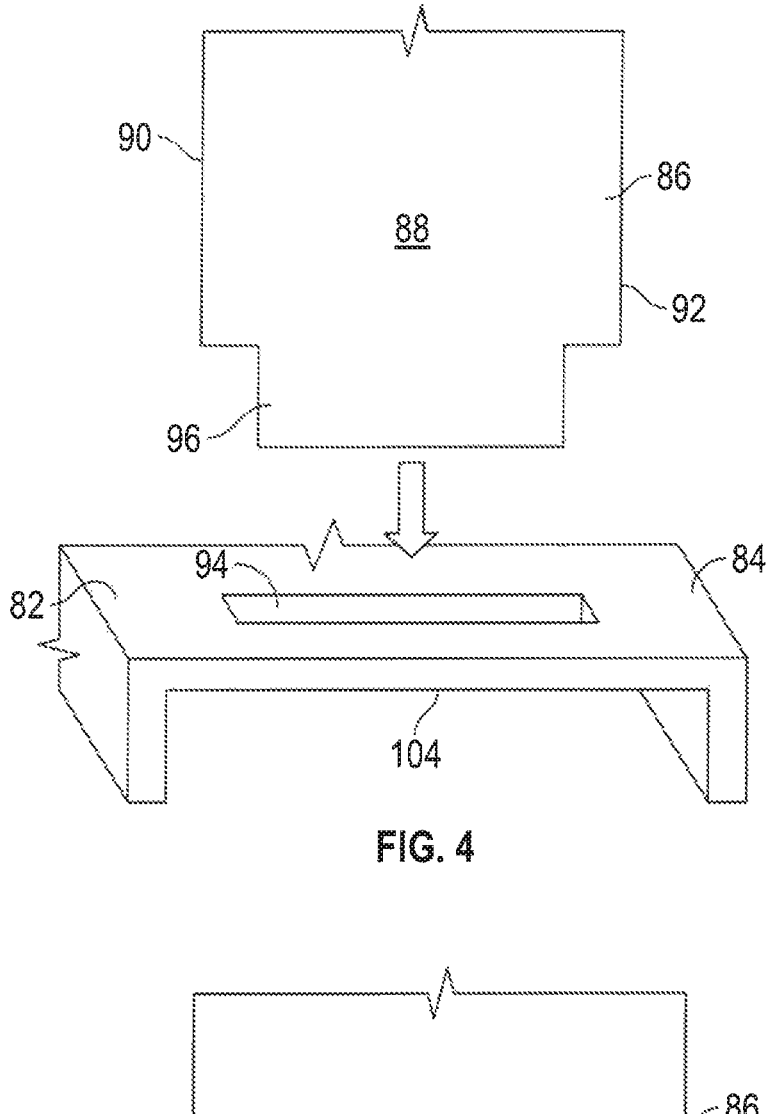
FIG. 4 is a partially exploded view of an embodiment of a stator assembly.
FIG. 5 is a partial cross-sectional view of an embodiment of a stator assembly.

Referring to FIGS. 4 and 5, shown is an attachment of the stator vane 86 to the inner shroud 82. While the attachment of the stator vane 86 to the inner shroud 82 is illustrated and described herein, it is to be appreciated that in other embodiments, such a configuration may be additionally or alternatively used to secure the stator vane 86 to the outer shroud 78. The inner shroud 82 includes a plurality of shroud openings 94 at the inner flowpath surface 84. A complimentary vane tab 96 extends from the vane body 88 into the shroud opening 94 and in some embodiments through the shroud opening 94, through a shroud back side 104 opposite the inner flowpath surface 84. Installing the vane tab 96 into the shroud opening 94 leaves a shroud gap 98 around a periphery of the stator vane 86 between the stator vane 86 and the inner shroud 82 at the shroud opening 94. The shroud gap 98 is filled with a volume of potting material 100 at the outer shroud 82, and the potting material 100 may extend partially onto the shroud back side 104 and/or onto the inner flowpath surface 84. In some embodiments, the potting material 100 is a rubber or other elastomeric material.

Under certain conditions, the potting material 100 may disbond from the stator vane 86 or from the inner shroud 82. To reduce or eliminate the disbond conditions, it is desired to further restrict motion of the stator vane 86 relative to the shroud opening 94.

Figure 6:
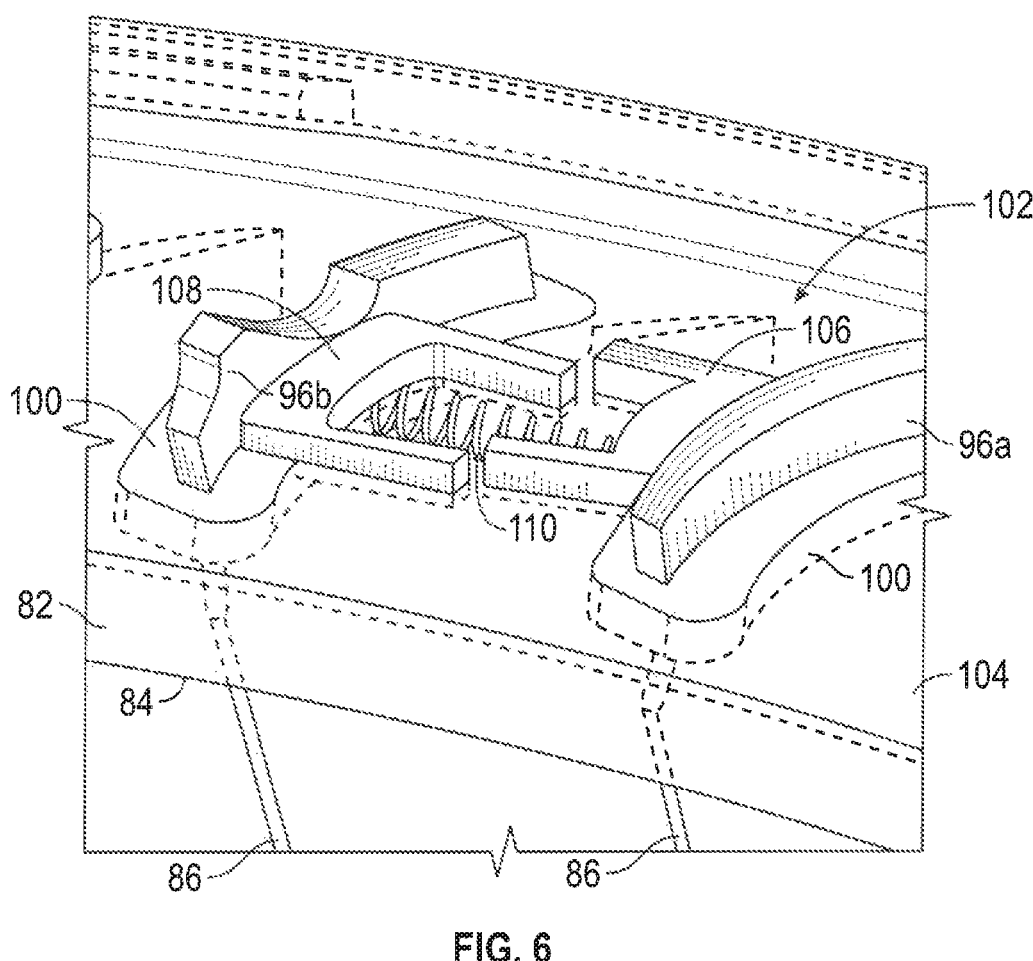
FIG. 6 is a perspective view of a stator assembly with a retainer clip.
Figure 7:
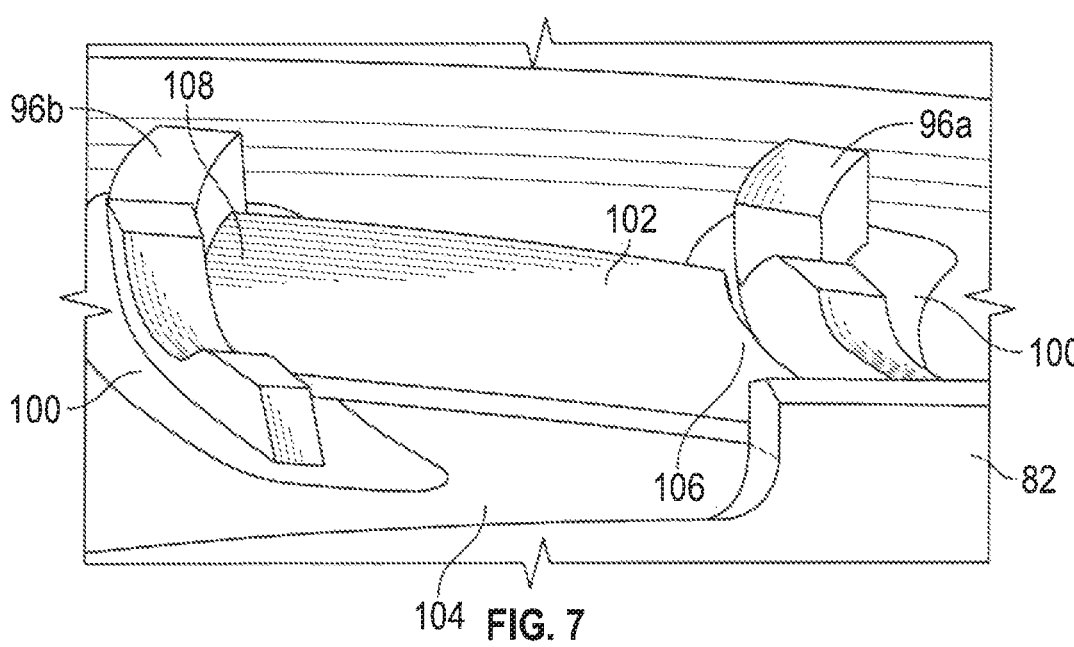
FIG. 7 is another perspective view of a stator assembly with a retainer clip.

Referring to FIG. 6, in some embodiments a clip 102 formed from, for example, a plastic material, is inserted between vane tabs 96 of adjacent stator vanes 86. The clip is installed at the back side 104 of the inner shroud 82 opposite the inner flowpath surface 84. The clip 102 includes a first clip portion 106 abutting a first vane tab 96a and a second clip portion 108 abutting a second vane tab 96b. A spring 110 extends between the first clip portion 106 and the second clip portion 108 such that the spring 110 is in a compressed state when the clip 102 is installed, with the first clip portion 106 and the second clip portion 108 exerting a circumferential force on the first vane tab 96a and the second vane tab 96b, respectively to restrict motion of the stator vanes 86 in the shroud openings 94. In another embodiment, as shown in FIG. 7, the clip 102 may extend continuously between the vane tabs 96a and 96b, and is formed from a compressible material. The clips 102 restrict motion of the stator vanes 86, while retaining the damping properties of the potting material 100 due to the spring-like properties of the clips 102.

Figures 8, 9:
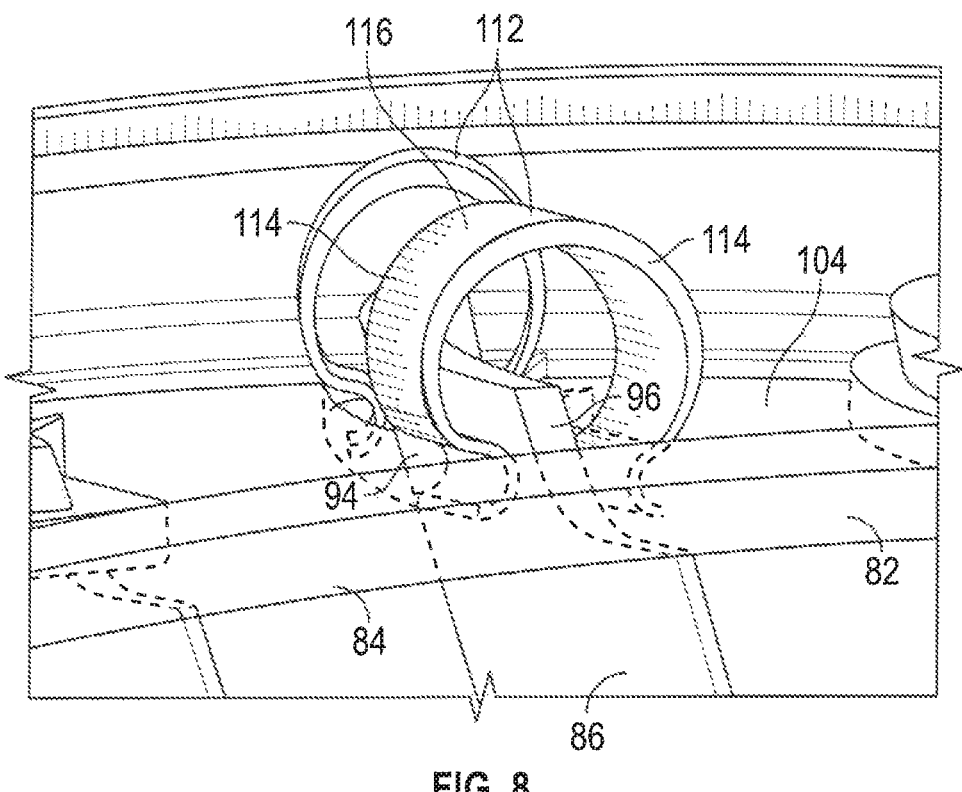
FIG. 8 is yet another perspective view of a stator assembly with a retainer clip.
FIG. 9 is a perspective view of a stator assembly with a retainer cap.

Referring to FIG. 8, in some embodiments one or more bumper clips 112 are installed over the vane tab 96. The bumper clip 112 has two clip legs 114 extending from a clip peak 116. The clip legs 114 extend through the shroud opening 94 laterally between the stator vane 86 and the inner shroud 82 at opposite circumferential sides of the stator vane 86. In some embodiments the clip leg 114 extends through the shroud opening to the flowpath surface 84. Further, the flowpath surface 84 may have a recess to receive the clip leg 114. The clip leg 114 may be a curved shape such that the clip leg 114 contacts one or both of the stator vane 86 and the inner shroud 82 at the shroud opening 94, while not contacting the stator vane 86 at any other locations along the bumper clip 112. In some embodiments, multiple bumper clips 112 are installed at each stator vane 86, such as two bumper clips 112 as shown in FIG. 8. The bumper clips 112 may be formed from a suitable material, such as a plastic material. In some embodiments, the bumper clips 112 are installed at the stator vanes 86 prior to installation of the potting material 100. The bumper clips 112 decrease a gap between the stator vane 86 and the inner shroud 82 at the shroud opening 94 thereby restricting circumferential motion of the stator vanes 86, while the configuration retains the damping effects of the potting material 100 through the elastic properties of the bumper clip 112.

Figures 10, 11:
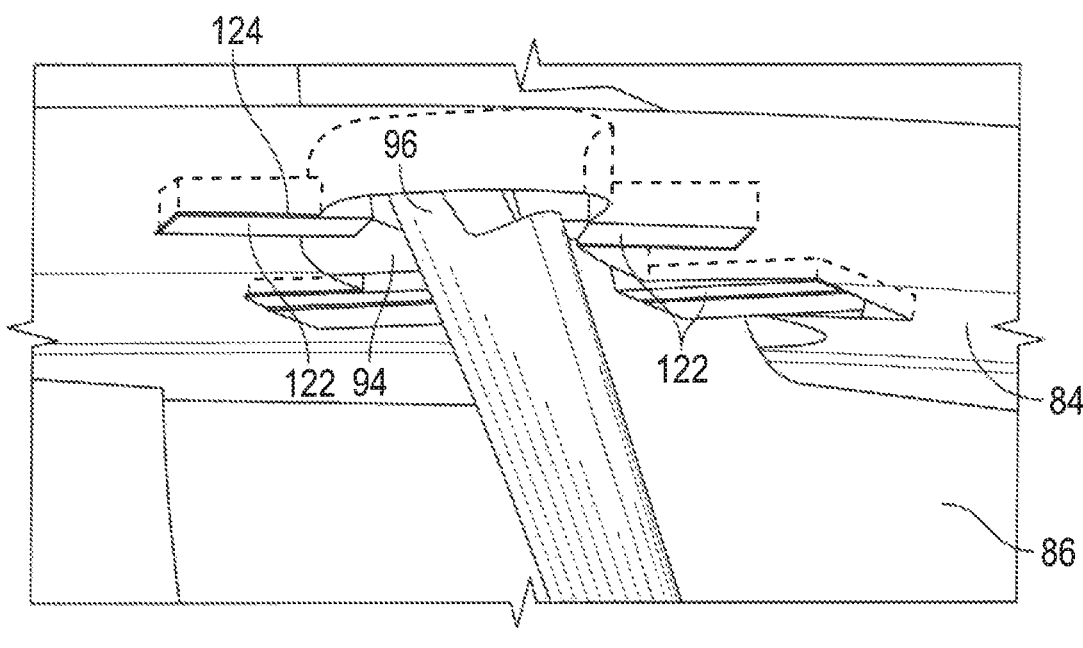
FIG. 10 is another perspective view of a stator assembly with a retainer cap.
FIG. 11 is a perspective view of a stator assembly with a retainer band.

Referring now to FIGS. 9 and 10, in other embodiments a cap 200 is installed at the vane tab 96 of the stator vane 86. The cap 200 is formed from, for example, a plastic material, and includes a cap base 118 located at a tab end 120 of the vane tab 96. In some embodiments, the cap base 118 is in contact with the tab end 120. The cap 200 includes two cap legs 122 extending from the cap base 118 toward the shroud opening 94 and through the shroud opening 94 between the stator vane 86 and the inner shroud 82. The cap legs 122 extend along circumferentially opposite sides of the stator vane 86. In some embodiments the cap leg 122 extends through the shroud opening 94 to the flowpath surface 84. Further, the flowpath surface 84 may have a recess 124 to receive the cap leg 122, as shown in FIG. 10. The cap leg 122 may contact one or both of the stator vane 86 and the inner shroud 82 at the shroud opening 94. In some embodiments, multiple caps 200 are installed at each shroud opening 94 such as two caps 200 as shown in FIGS. 9 and 10. In some embodiments, the caps 200 are installed at the stator vanes 86 prior to installation of the potting material 100. The caps 200 decrease the gap between the stator vane 86 and the inner shroud 82 at the shroud opening 94, thereby restricting circumferential motion of the stator vanes 86, while the configuration retains the damping effects of the potting material 100 through the elastic properties of the caps 200.

Referring now to FIG. 11, in some embodiments a band 126 is installed at the back side 104 of the inner shroud 82, and in some embodiments is a full annulus about engine central longitudinal axis A. The band 126 is formed from, for example, a plastic material and has a plurality of band openings 128. The band openings 128 align with the plurality of vane tabs 96 such that a vane tab 96 extends through each band opening 128 of the plurality of band openings 128. In some embodiments, a circumferential width of the band openings 128 is less than a circumferential width of the shroud openings 94 of the inner shroud 82. This configuration, when installed at the vane tabs 96, restricts circumferential motion of the stator vane 86 due to reduced space around the vane tabs 96. In some embodiments, the band 126 is installed prior to installation of the potting material 100, so that the damping effects of the potting material 100 are preserved.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A stator vane assembly of a gas turbine engine, comprising:
a stator shroud having a plurality of shroud openings formed therein, the stator shroud defining a flowpath surface;
a plurality of stator vanes, one stator vane of the plurality of stator vanes installed in each shroud opening of the stator shroud;
a volume of potting material disposed in the plurality of shroud openings to retain the stator vanes thereat; and
one or more retainers disposed at a back surface of the stator shroud opposite the flowpath surface to restrict circumferential movement of the plurality of stator vanes relative to the stator shroud;
wherein a retainer of the one or more retainers contacts and exerts a circumferential force on circumferentially adjacent stator vanes of the plurality of stator vanes;
wherein the retainer includes:
a first clip portion disposed at and contacting a first stator vane of the plurality of stator vanes, the first clip portion including:
a clip portion base contacting the first stator vane; and
two clip portion arms extending from the clip portion base in a circumferential direction toward a second stator vane of the plurality of stator vanes;
a second clip portion separate and distinct from the first clip portion, the second clip portion disposed at and contacting the second stator vane circumferentially adjacent to the first stator vane; and
a spring connected to the clip portion base and extending between the first clip portion and the second clip portion configured to urge the first clip portion circumferentially away from the second clip portion.

2. A gas turbine engine, comprising:
a combustor;
a turbine in flow communication with the combustor; and
a stator assembly, including:
a stator shroud having a plurality of shroud openings formed therein, the stator shroud defining a flowpath surface;
a plurality of stator vanes, one stator vane of the plurality of stator vanes installed in each shroud opening of the stator shroud;
a volume of potting material disposed in the plurality of shroud openings to retain the stator vanes thereat; and
one or more retainers disposed at a back surface of the stator shroud opposite the flowpath surface to restrict circumferential movement of the plurality of stator vanes relative to the stator shroud;
wherein a retainer of the one or more retainers contacts and exerts a circumferential force on circumferentially adjacent stator vanes of the plurality of stator vanes;
wherein the retainer includes:
a first clip portion disposed at and contacting a first stator vane of the plurality of stator vanes, the first clip portion including:
a clip portion base contacting the first stator vane; and two clip portion arms extending from the clip portion base in a circumferential direction toward a second stator vane of the plurality of stator vanes;

a second clip portion separate and distinct from the first clip portion, the second clip portion disposed at and contacting the second stator vane circumferentially adjacent to the first stator vane; and a spring connected to the clip portion base and extending between the first clip portion and the second clip portion configured to urge the first clip portion circumferentially away from the second clip portion.

3. The stator vane assembly of claim 1, where at least one of the first clip portion and the second clip portion is U-shaped.

4. The gas turbine engine of claim 2, where at least one of the first clip portion and the second clip portion is U-shaped.

* * * * *